(12) United States Patent
Kikuchi

(10) Patent No.: US 7,384,450 B2
(45) Date of Patent: Jun. 10, 2008

(54) METHOD FOR PRODUCING METALLIC IRON

(75) Inventor: Shoichi Kikuchi, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 10/493,313

(22) PCT Filed: Oct. 25, 2002

(86) PCT No.: PCT/JP02/11085

§ 371 (c)(1),
(2), (4) Date: May 4, 2004

(87) PCT Pub. No.: WO03/042415

PCT Pub. Date: May 22, 2003

(65) Prior Publication Data

US 2005/0087039 A1    Apr. 28, 2005

(30) Foreign Application Priority Data

Nov. 12, 2001 (JP) ............................. 2001-346675
Aug. 23, 2002 (JP) ............................. 2002-243385

(51) Int. Cl.
*C21B 13/08* (2006.01)
(52) U.S. Cl. .......................................... 75/484; 75/503
(58) Field of Classification Search .................... 75/484
See application file for complete search history.

(56) References Cited

U.S. PATENT DOCUMENTS

| | | | | |
|---|---|---|---|---|
| 3,333,951 A | * | 8/1967 | Ban ............................. 75/484 |
| 4,341,598 A | * | 7/1982 | Green ........................... 202/99 |
| 5,186,741 A | * | 2/1993 | Kotraba et al. ................. 75/484 |
| 5,575,824 A | * | 11/1996 | Brown et al. .................. 44/505 |
| 5,989,019 A | | 11/1999 | Nishimura et al. |
| 6,063,156 A | | 5/2000 | Negami et al. |
| 6,126,718 A | * | 10/2000 | Sawa et al. .................... 75/485 |
| 6,129,777 A | | 10/2000 | Fuji et al. |

(Continued)

FOREIGN PATENT DOCUMENTS

JP    11-335712    12/1999

(Continued)

OTHER PUBLICATIONS

The Making Shaping and Treating of Steel, United States Steel, 10th edition, 1985, p. 143.*

(Continued)

*Primary Examiner*—Roy King
*Assistant Examiner*—Tima M McGuthry-Banks
(74) *Attorney, Agent, or Firm*—Oblon, Spivak, McClelland, Maier & Neustadt, P.C.

(57) ABSTRACT

In a method of producing metallic iron by reducing and melting a raw material, which contains an iron oxide-containing material and a carbonaceous reducing agent, by heating, the raw material for producing metallic iron is supplied after a powder and granular atmosphere control carbonaceous material is spread on a hearth of a heat-reducing furnace. In this case, a non-resolidificable carbonaceous material is used as the atmosphere control carbonaceous material, and thus a phenomenon that the powder and granular carbonaceous material is resolidified into a rice-cracker-like shape can be suppressed, thereby permitting solid-phase reduction with high efficiency and stable operationality.

7 Claims, 5 Drawing Sheets

U.S. PATENT DOCUMENTS

| | | | |
|---|---|---|---|
| 6,149,709 A | 11/2000 | Uragami et al. | |
| 6,152,983 A | 11/2000 | Kamijo et al. | |
| 6,241,803 B1 | 6/2001 | Fuji | |
| 6,251,161 B1 | 6/2001 | Tateishi et al. | |
| 6,254,665 B1 | 7/2001 | Matsushita et al. | |
| 6,258,149 B1 | 7/2001 | Sugiyama et al. | |
| 6,270,552 B1 | 8/2001 | Takeda et al. | |
| 6,296,479 B1 | 10/2001 | Nishimura et al. | |
| 6,302,938 B1 | 10/2001 | Kamijo et al. | |
| 6,319,302 B1 | 11/2001 | Harada | |
| 6,334,883 B1 | 1/2002 | Takenaka et al. | |
| 6,368,379 B1 | 4/2002 | Tateishi et al. | |
| 6,413,295 B2 * | 7/2002 | Meissner et al. | 75/484 |
| 6,500,381 B1 | 12/2002 | Harada | |
| 6,503,289 B2 | 1/2003 | Tanigaki et al. | |
| 6,511,316 B2 | 1/2003 | Harada et al. | |
| 6,517,770 B1 | 2/2003 | Tateishi et al. | |
| 6,521,171 B2 | 2/2003 | Tateishi et al. | |
| 6,569,223 B2 | 5/2003 | Tanigaki et al. | |
| 6,579,505 B2 | 6/2003 | Tsuchiya et al. | |
| 6,585,800 B2 | 7/2003 | Sugitatsu et al. | |
| 6,592,647 B2 | 7/2003 | Hino et al. | |
| 6,592,649 B2 | 7/2003 | Kikuchi et al. | |
| 6,602,320 B2 | 8/2003 | Fuji et al. | |
| 6,630,010 B2 | 10/2003 | Ito et al. | |
| 6,648,942 B2 * | 11/2003 | Hoffman et al. | 75/484 |
| 6,660,221 B2 | 12/2003 | Urabe et al. | |
| 6,669,470 B2 | 12/2003 | Atsushi et al. | |
| 6,669,756 B2 | 12/2003 | Urabe et al. | |
| 6,685,466 B2 | 2/2004 | Harada et al. | |
| 6,689,182 B2 | 2/2004 | Tokuda et al. | |
| 2004/0083853 A1 | 5/2004 | Sugitatsu et al. | |

FOREIGN PATENT DOCUMENTS

| | | |
|---|---|---|
| JP | 2000-45008 | 2/2000 |
| JP | 2000-109912 | 4/2000 |
| JP | 2002-302710 | 10/2002 |
| WO | 99/16913 | 4/1999 |
| WO | 00/29628 | 5/2000 |

OTHER PUBLICATIONS

Webster's Third New International Dictionary of the English Language, Unabridged, 1981, p. 877.*

Perry's Chemical Engineers' Handbook, Seventh Edition, 1997, p. 27-4.*

Webster's Third New International Dictionary of the English Language, Merriam-Webster Inc., 1981, pp. 1538 and 1933.*

Metals Handbook, Desk Edition, $2^{nd}$ Edition, ASM International, 1998, pp. 41 and 49.*

Degel, Rolf et al. "A new generation of rotary hearth furnace technology for coal based DRI production", Stahl und Eisen, Verlag Stahleisen GMBH, vol. 120, No. 2, pp. 33-40, XP000933033, ISSN: 0340-4803, 2000.

* cited by examiner

METHOD FOR PRODUCING METALLIC IRON

TECHNICAL FIELD

The present invention relates to a method of producing metallic iron, and particularly to a method improved for permitting a smooth continuous operation by preventing a phenomenon that in producing metallic iron by heat-reducing a mixture of an iron oxide-containing material and a carbonaceous reducing agent on a moving hearth, an atmosphere control carbonaceous material, which is spread on the hearth to increase an atmospheric reduction potential on the hearth for heating reduction, is resolidified into a sheet shape to inhibit operationality.

BACKGROUND ART

Relatively new methods of producing metallic iron by heat-reducing an iron oxide source such as an iron ore or the like include a method of producing metallic iron comprising reducing iron oxide by heating, on a moving hearth, a mixed power containing an iron oxide source such as iron ore and a carbonaceous reducing agent such as a carbonaceous material, or a carbonaceous material-containing raw material agglomerated by pelletizing the mixture.

In carrying out this method, a known method is performed, in which in order to increase a reduction potential on the hearth for heating-reduction to improve a reduction efficiency, an atmosphere control carbonaceous material is spread on the hearth before the raw material is charged (for example, Japanese Unexamined Patent Application Publication Nos. 11-106816, 11-106816, 11-172312, 11-335712, 2000-45008, etc.). The atmosphere control carbonaceous material is confirmed to effectively function to prevent direct contact between a hearth refractory and metallic iron and generated slag, which are produced by heating-reduction, and to suppress corrosion of the hearth refractory.

As a result of the advance of research on a method of producing metallic iron by using an atmosphere control carbonaceous material, the inventors found that the above-described conventional methods have the unsolved problems below.

The greatest problem pointed out in the conventional methods is that a powder and granular carbonaceous material used for controlling an atmosphere is fused and solidified into a rice-cracker-like shape in the step of heat-reducing the iron oxide-containing raw material to cause warping, depending on the type of the powder and granular carbonaceous material used, thereby significantly hindering a continuous operation. When such a phenomenon occurs on the hearth during an operation, the following various problems are caused.

(1) The metallic iron and generated slag produced by heating-reduction are generally solidified by cooling on the lowermost stream side of a production apparatus, and then discharged from the hearth by using a scraper device such as a screw or the like. However, the warped carbonaceous material resolidified into a rice-cracker-like shape is caught by the scraper device, thereby significantly inhibiting discharge of the metallic iron and generated slag from the hearth.

(2) When the carbonaceous material re-solidified into a rice-cracker-like shape is forcedly discharged from the hearth by using the scraper device, a large load is applied to the scraper device to cause a failure in the device. Also, the hearth refractory is damaged by the re-solidified carbonaceous material to significantly deteriorate durability.

(3) The metallic iron produced by reduction is partially contained in the re-solidified carbonaceous material, thereby deteriorating a recovery ratio of the metallic iron.

(4) When a resolidificable carbonaceous material is spread on the hearth before a raw material is charged, the carbonaceous material is re-solidified into a rice-cracker-like shape to cause warping. Therefore, when a raw material is supplied on the re-solidified carbonaceous material, the raw material flows toward a lower portion or drops into a crack of the carbonaceous material layer, thereby failing to charge the raw material in a uniform thickness.

Furthermore, most of the carbonaceous material discharged from the hearth still has high reduction activity. However, in the conventional technique, the carbonaceous material is discarded with substantially no further treatment, leaving room for improvement from the viewpoint of effective utilization of valuable resources.

The present invention have been achieved in consideration of the above-described situation, and an object of the present invention is to resolve the above various problems due to the rice-cracker-like carbonaceous material produced by re-solidification of a powder and granular carbonaceous material used for controlling an atmosphere. Another object of the present invention is to establish a technique for effectively recycling the used carbonaceous material still having reduction activity as a variable resource, to decrease the consumption of the atmosphere control carbonaceous material.

DISCLOSURE OF INVENTION

In order to achieve the objects, a method of producing metallic iron according to the present invention comprises heating, on a moving hearth, a raw material containing an iron oxide-containing material and a carbonaceous reducing agent to reduce iron oxide contained in the raw material, wherein the raw material is supplied after a powder and granular atmosphere control carbonaceous material is spread on the hearth, and a non-resolidificable carbonaceous material is used as the atmosphere control carbonaceous material.

As the atmosphere control carbonaceous material used in the present invention, a preferred carbonaceous material has a grain diameter of substantially 3.35 mm or less, contains 20% by mass or more of grains having a grain diameter in the range of 0.5 to 3.35 mm, and has a maximum fluidity degree of 0 (zero). Another preferred example of the atmosphere control carbonaceous material is a non-resolidificable carbonaceous material obtained by heat-treating a resolidificable carbonaceous material at a temperature of about 500° C. or more.

Also, a recovered carbonaceous material having been heated because of use as the atmosphere control carbonaceous material in a metallic iron producing apparatus loses its resolidificability due to the heat treatment, and is made non-resolidificable. Therefore, the recovered carbonaceous material can also be effectively used as the non-resolidificable carbonaceous material, and a carbonaceous material, which is originally non-resolidificable, maintains its non-resolidificability under the heat treatment, and can thus be recovered and recycled.

In the present invention, another effective carbonaceous material is a mixed non-resolidificable carbonaceous material containing a resolidificable carbonaceous material and a non-resolidificable carbonaceous material. In this case, a flesh carbonaceous material can be used as the resolidificable carbonaceous material, and a carbonaceous material heat-treated at a temperature of about 500° C. or more can be preferably used as the non-resolidificable carbonaceous material. Particularly, the carbonaceous material having been heated in the metallic iron producing apparatus loses its resolidificability due to the heat treatment, and thus the carbonaceous material having been heated is recovered and recycled to cause the advantage that the consumption of the atmosphere control carbonaceous material can be decreased in cooperation with the effective utilization of waste materials.

Furthermore, by using the carbonaceous material recycling method, fine-grain metallic iron and generated slag, which are mixed in the recovered carbonaceous material, can be recovered by treatment in a next step, and thus the recovery ratio of the metallic iron can be increased. When the generated slag is effectively used as a by-product, the recovery ratio of the slag can also be increased.

In the use of the mixture of the resolidificable carbonaceous material and the non-resolidificable carbonaceous material, a preferred mixing ratio depends on the resolidification force of the resolidificable carbonaceous material used, but the mixing ratio of the non-resolidificable carbonaceous material is preferably in the range of 50 to 90% by mass relative to 50 to 10% by mass of the resolidificable carbonaceous material.

In carrying out this method, a portion of the metallic iron, particularly fine-grain metallic iron, discharged from the moving hearth furnace is preferably returned to the moving hearth furnace, and the carbonaceous material can be efficiently recovered by using static electricity.

BEST MODE FOR CARRYING OUT THE INVENTION

Figure 1:
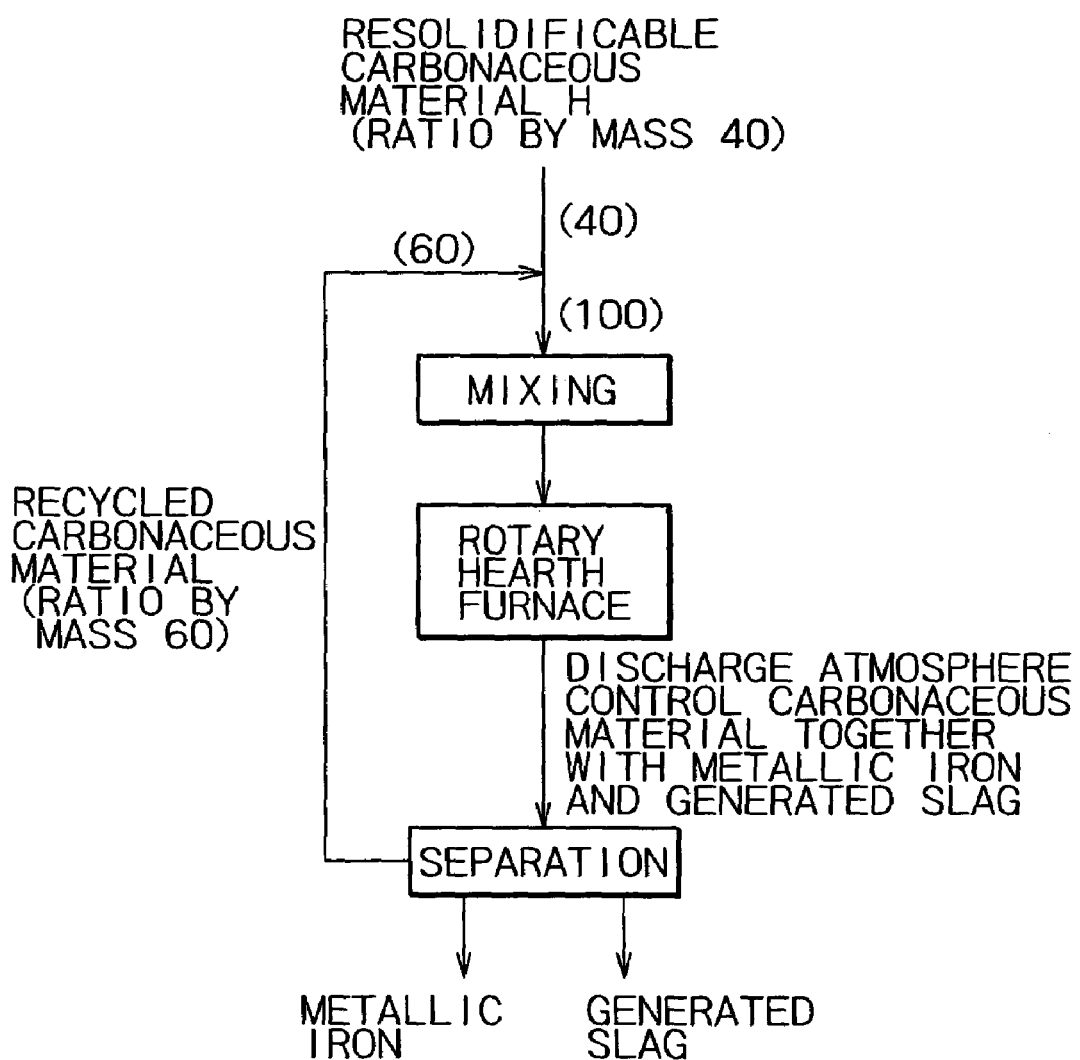
FIG. 1 is a flowchart of reduction and melting performed in an example of the present invention.

The present invention can be applied to the methods disclosed in, for example, U.S. Pat. No. 6,036,744, and Japanese Unexamined Patent Application Publication Nos. 9-256017, 2000-144224 and 11-131119, in which an iron oxide-containing material such as an iron ore is mixed with a carbonaceous reducing agent such as a carbonaceous material, and if required, the resultant mixture is agglomerated or formed into pellets, reduced by heating on a moving hearth, and further heated to melt and aggregate the produced reduced iron and separate the generated slag, to produce granular or lump high-purity metallic iron.

As described above with respect to the related art, it is already known that in practical use of the above-described method of producing metallic iron, as a means for efficiently progressing heating-reduction of the iron oxide source in the raw material mixture on the moving hearth, a powder and granular atmosphere control carbonaceous material is spread on the hearth before the raw material is charged, to maintain the reduction potential on the hearth at a high level during heating-reduction. Consequently, the reduction efficiency is increased to improve the recovery ratio of metallic iron.

However, the conventional technique causes the above-described various troubles in the operation due to the phenomenon that the carbonaceous material is resolidified in a sheet shape by heat for reduction and melting, depending on the type of the atmospheric control carbonaceous material used.

Therefore, research was advanced for resolving the above-described problems due to the resolidification of the atmosphere control carbonaceous material, and for permitting efficient and smooth production of metallic iron from various angles. As a result, it was found that the above problems can be solved by using, as the atmosphere control carbonaceous material, a carbonaceous material, which can maintain a powder and granular state without being resolidified even under a heating condition for reduction and melting of the raw material mixture. This resulted in achievement of the present invention.

Therefore, the present invention is characterized by using a non-resolidificable carbonaceous material as the atmosphere control carbonaceous material. Examples of the non-resolidificable carbonaceous material include the following.

(1) Carbonaceous material having a grain diameter of substantially 3.35 mm or less, containing 20% by mass or more, preferably 40% by mass or more, of grains having a grain diameter in the range of 0.5 to 3.35 mm, and having a maximum fluidity degree (which will be described below) of zero (0):

The carbonaceous material satisfying such a grain size pattern and maximum fluidity degree is not resolidified under a basically reducing high-temperature condition (generally 700 to 1600° C., and more generally 900 to 1500° C.), and maintains a powder and granular state. However, as described in the examples below, it was confirmed that even with a maximum fluidity degree of zero, a powder and granular carbonaceous material having a grain diameter of 3.35 mm or less, and containing less than 20% by mass of coarse grains having a grain diameter in the range of 0.5 to 3.35 mm causes resolidification under the temperature condition of reduction and melting. Although the reason for this is not known yet at present, it is considered that the carbonaceous material contains a large amount of fine grains of less than 0.5 mm, and the fine grains function as a binder to promote resolidification of the carbonaceous material. Furthermore, as the ratio of the fine grains of less than 0.5 mm increases, scattering due to an air flow in the metallic iron producing apparatus undesirably increases.

A coarse carbonaceous material having a grain diameter of over 3.35 mm causes no problem due to resolidification, but mixing of the coarse material having a grain diameter of over 3.35 mm must be avoided as much as possible because the function as the atmosphere control carbonaceous material deteriorates due to a shortage of surface area. In order to effectively exhibit the function as the atmosphere control carbonaceous material, a material containing 60% by mass or less of the coarse grains in the range of 0.5 to 3.35 mm is preferably used.

(2) Carbonaceous material heat-treated at a temperature of about 500° C. or more:

The inventors confirmed that a resolidificable carbonaceous material loses its resolidificability by heat-treatment at a temperature of about 500° C. or more in a non-oxidizing atmosphere, and is made non-resolidificable. Therefore, when a resolidificable carbonaceous material short of suitability is heat-treated at about 500° C. or more, preferably about 600 to 1200° C., for about 5 to 15 minutes in a non-oxidizing atmosphere, the material can be changed to a carbonaceous material which can be used as the non-resolidificable carbonaceous material without any problem.

In producing metallic iron by using the moving hearth furnace, the recovered carbonaceous material separated from the metallic iron and the generated slag and recovered after being used as the atmosphere control carbonaceous material experiences heating corresponding to the heat treatment, and is thus converted to a non-resolidificable carbonaceous material by heating in the non-oxidizing atmosphere. Therefore, the recycled carbonaceous material can be effectively used as the atmosphere control carbonaceous material with grain size control after recovery according to demand.

(3) Mixed non-resolidificable carbonaceous material containing a resolidificable carbonaceous material and a proper amount of non-resolidificable carbonaceous material:

As seen from the examples below, when an appropriate amount of non-resolidificable carbonaceous material is mixed with a resolidificable carbonaceous material having a maximum fluidity degree of more than zero, the mixed carbonaceous material can be made non-resolidificable as a whole, and can thus be used as the non-resolidificable atmosphere control carbonaceous material. As the non-resolidificable carbonaceous material, the above-descried non-resolidificable carbonaceous material obtained by heat-treating a resolidificable carbonaceous material, and the above-described recovered carbonaceous material recovered after experiencing the heating in the metallic iron producing apparatus can be used.

The preferred amount of the non-resolidificable carbonaceous material mixed with the resolidificable carbonaceous material depends upon the degree of resolidificability of the resolidificable carbonaceous material used, for example, the value of a maximum fluidity degree. With the resolidificable carbonaceous material originally having a low fluidity degree, the material can be converted to a non-resolidificable material by mixing only a small amount of non-resolidificable carbonaceous material, while with the resolidificable carbonaceous material having a high fluidity degree, a relatively large amount of non-resolidificable carbonaceous material must be mixed. However, the standard amount of the non-resolidificable carbonaceous material mixed for making the resolidificable carbonaceous material non-resolidificable is in the range of 50 to 90% by mass relative to 50 to 10% by mass of the resolidificable carbonaceous material, more generally in the range of 40 to 90% by mass relative to 60 to 10% by mass of the resolidificable carbonaceous material.

Of the above-described materials, most preferable materials for the present invention include the recovered carbonaceous material modified to non-resolidificable by the heat treatment in the metallic iron producing apparatus, and the mixed carbonaceous material made non-resolidificable by mixing the recovered carbonaceous material with the resolidificable carbonaceous material. In the conventional technique using the atmosphere control carbonaceous material for improving the reduction efficiency, the atmosphere control carbonaceous material discharged together with metallic iron and generated slag is neither recovered nor recycled, but it is mostly discarded for reclamation together with the generated slag.

However, the carbonaceous material used as the atmosphere control carbonaceous material must maintain reduction activity for preventing reoxidation of metallic iron even in the final stage of heating reduction and melting, and thus the discharged carbonaceous material has significant reduction activity, and can be used as a reducing agent. Furthermore, as described above, the recovered carbonaceous material is converted to the non-resolidificable carbonaceous material by heat for reduction and melting of the iron oxide source. Therefore, by effectively using the recovered non-resolidificable carbonaceous material as a recycled carbonaceous material, resolidification of the carbonaceous material can be securely prevented to further improve operation stability, as compared with the use of a fresh carbonaceous material.

Furthermore, when the recovered carbonaceous material is recycled as described above, a significant amount of fine-grain metallic iron contained in the recovered carbonaceous material is again returned to the metallic iron producing apparatus, thereby contributing to an improvement in the recovery efficiency of the metallic iron. Similarly, when the generated slag is also recovered as a valuable resource, the slag mixed as fine grains in the recovered carbonaceous material is also returned to the metallic iron producing apparatus together with the carbonaceous material, thereby contributing to an improvement in the recovery efficiency of the generated slag.

By making good use of the present invention as described above, the following many advantages can be obtained.

1) The problems of resolidification of the carbonaceous material can be solved.

2) The carbonaceous material, which maintains reduction activity and which is conventionally discarded, can be effectively used, thereby contributing to a decrease in the consumption of the carbonaceous material.

3) Metallic iron fine grains which are discarded and lost together with the carbonaceous material are recycled together with the carbonaceous material, thereby improving the recovery efficiency of the metallic iron.

4) Similarly, the generated slag can be recovered as a valuable resource, improving the recovery efficiency.

Furthermore, the construction of an apparatus used for carrying out the present invention, i.e., a moving hearth-type heating furnace for reduction and melting, is not limited, and all reduction melting furnaces disclosed in, for example, U.S. Pat. No. 6,036,744, and Japanese Unexamined Patent Application Publication Nos. 9-256017, 2000-144224 and 11-131119 can be used. However, as a preferred apparatus, a rotary hearth furnace is recommended for continuously efficiently performing an operation comprising heat-reducing a raw material, melting reduced iron and aggregating the molten iron to a granular material, and separating the generated slag.

In the present invention, the type of the iron oxide-containing material used as the iron source is not limited, and besides a typical iron ore, an iron making waste material and discard such as iron-making and steel-making dust discharged from an iron-making factory, classified and recovered iron scraps, and the like can be used as the raw material. These iron sources can be used in a combination of a plurality of the sources according to demand.

Also, the carbonaceous reducing agent necessary for reducing the ion oxide-containing material is not limited, and any material can be used as long as it comprises carbon as a main component and releases reducing carbon monoxide by combustion or pyrolysis. Furthermore, as the atmosphere control carbonaceous material, any material can be used as long as it can be converted to a non-resolidificable carbonaceous material by modifying or mixing with any one of various types of coal or coke, which are adaptable to the objects of the present invention, according to demand.

The specified condition for reduction and melting is not particularly specific, and the conditions disclosed in, for example, U.S. Pat. No. 6,036,744, and Japanese Unexamined Patent Application Publication Nos. 9-256017, 2000-144244 and 11-131119 may be used. However, a preferred standard condition is satisfied by a two-step heating system in which solid-phase reduction is mainly progressed at a furnace temperature kept at 1200 to 1500° C., preferably in the range of 1200 to 1400° C., and then the furnace temperature is increased to 1400 to 1500° C. to reduce the remaining iron oxide, and to melt the produced metallic iron (reduced iron) to aggregate the iron into grains. By setting this condition, granular metallic iron can be stably produced in high yield. The necessary time is about 8 to 13 minutes. Under this condition, solid-phase reduction of iron oxide, melting and coalescence can be completed within such a short time.

Furthermore, in the present invention, as described above, the atmosphere control carbonaceous material is spread on the hearth for reducing iron oxide to keep the reduction potential on the hearth at a high level, thereby stably securing a high reduction efficiency without reoxidization of the reduced iron, particularly at the final stage of heating reduction or at the time of melting of the reduced iron. The carbonaceous material spread on the hearth refractory can also prevent a phenomenon that the molten iron and slag produced by reduction and melting are brought into direct contact with the hearth refractory to deteriorate the refractory, thereby contributing to life lengthening of the hearth refractory. In order to effectively exhibit these functions, the thickness of the atmosphere control carbonaceous material spread on the hearth surface is preferably in the range of 1 to 10 mm.

In general, the metallic iron, the generated slag, and the atmosphere control carbonaceous material are discharged in a mixed state from the metallic iron producing apparatus. Of these discharged materials, the metallic iron can be recovered by magnetic force, or the like. A portion of the metallic iron, particularly fine grains, is preferably returned to the moving hearth furnace and re-aggregated therein, thereby preferably increasing the yield of coarse-grain metallic iron which can easily be handled as a product and which causes less oxidative deterioration. In addition, the generated slag and the atmosphere control carbonaceous material can be substantially separated by a sieving operation, but both materials are preferably separated by using static electricity because grains having substantially the same size or fine grains, which cannot be separated by a sieve, can easily be separated. A combination of a separation operation using a sieve or magnetic force and a separation operation using static electricity is effective according to demand.

EXAMPLES

Although the construction of the present invention and the operation will be described in detail below with reference to examples, the present invention is not limited to these examples, and can be carried out according to appropriate modifications within the scope of the gist of the present invention described above and below. These modifications are included in the technical field of the present invention.

Example 1

Each of carbonaceous materials having the chemical compositions shown in Table 1 below was independently subjected to the heating test described below. The grain size of each carbonaceous material was controlled in the range of 0.5 to 1.0 mm. Each carbonaceous material was heated at 1000° C. for 90 seconds in a nitrogen atmosphere in a tubular electric furnace, cooled and then observed with respect to the appearance to examine the presence of resolidification. Also, the maximum fluidity degree of each carbonaceous material was measured. The maximum fluidity degree is defined by JIS M8801, and can be determined by using Gieseler Plastometer. The maximum fluidity degree is a value represented by log DDPM.

The results are as shown in Table 1. Carbonaceous materials A to F having a maximum fluidity degree of 0 (zero) did not exhibit resolidificability, and maintained a powder and granular state after heat treatment. On the other hand, carbonaceous materials G to J having a maximum fluidity degree of over 0 were resolidified in a bulk state in the tube electric furnace. It was also confirmed that carbonaceous materials K and L obtained by heat-treating carbonaceous materials I and J, respectively, at 1000° C. for 8 minutes in a nitrogen atmosphere were made non-resolidificable by the heat treatment.

TABLE 1

| Symbol | Carbonaceous material sample | Analytical value (mass %) | | | | Result of heating test | Melt softening maximum fluidity degree |
|---|---|---|---|---|---|---|---|
| | | Ash content | Volatile content | Fixed carbon | Total | | |
| A | Carbonaceous material | 13.5 | 2.0 | 84.5 | 100 | No re-solidification | 0 |
| B | Carbonaceous material | 0.1 | 7.5 | 92.7 | 100 | No re-solidification | 0 |
| C | Carbonaceous material | 17.0 | 5.6 | 77.1 | 100 | No re-solidification | 0 |
| D | Carbonaceous material | 4.5 | 7.1 | 88.5 | 100 | No re-solidification | 0 |
| E | Carbonaceous material | 13.6 | 9.4 | 77.0 | 100 | No re-solidification | 0 |
| F | Carbonaceous material | 16.7 | 16.9 | 66.4 | 100 | No re-solidification | 0 |
| G | Carbonaceous material | 11.9 | 37.2 | 50.9 | 100 | Re-solidification | 0.2 |

TABLE 1-continued

| Symbol | Carbonaceous material sample | Analytical value (mass %) | | | | Result of heating test | Melt softening maximum fluidity degree |
|---|---|---|---|---|---|---|---|
| | | Ash content | Volatile content | Fixed carbon | Total | | |
| H | Carbonaceous material | 9.8 | 15.9 | 74.3 | 100 | Re-solidification | 0.5 |
| I | Carbonaceous material | 7.4 | 35.4 | 57.2 | 100 | Re-solidification | 1.1 |
| J | Carbonaceous material | 8.8 | 19.6 | 71.6 | 100 | Re-solidification | 2.6 |
| K | Heat-treated product of I | | | | | No re-solidification | |
| L | Heat-treated product of J | | | | | No re-solidification | |

Of the carbonaceous materials shown in Table 1, each of the carbonaceous materials exhibiting resolidificability was mixed with a non-resolidificable material, and the resultant mixture was heated at 1000° C. for 90 seconds in a nitrogen atmosphere to examine resolidificability. The results are shown in Table 2. Table 2 indicates that a mixed non-resolidificable carbonaceous material can be obtained by mixing an appropriate amount of non-resolidificable carbonaceous material with a resolidificable carbonaceous material. In this case, it is recognized that with a resolidificable carbonaceous material having a high maximum fluidity degree, the mixing ratio of the non-resolidificable carbonaceous material for removing resolidificability must be increased.

TABLE 2

| Main carbonaceous material (resolidificable carbonaceous material) | Sub-carbonaceous material (non-resolidificable carbonaceous material) | Mixing ratio of sub-carbonaceous material for making non-resolidificable (mass %) |
|---|---|---|
| I | K | 80 |
| J | L | 90 |
| I | C | 80 |
| J | C | 90 |
| H | A | 60 |
| H | B | 60 |
| H | C | 60 |
| H | D | 60 |
| H | E | 60 |
| H | F | 60 |
| G | C | 60 |

Example 2

In producing metallic iron by reducing and melting carbonaceous material-containing iron ore pellets (grain diameter: 16 to 20 mm) by a rotary hearth-type reduction melting apparatus using carbonaceous material H (grain diameter: 3 mm or less) shown in Table 1 as an atmosphere control carbonaceous material according to the flowchart of FIG. 1, experiment on a recycle of the atmosphere control carbonaceous material was carried out. Namely, the atmosphere control carbonaceous material (mixture of fresh material of carbonaceous material H and a recycled material thereof) was spread to a thickness of about 3 to 6 mm on a hearth of a raw material feed portion of the rotary hearth furnace, and raw material pellets were supplied onto the hearth under heating to reduce and melt the raw material pellets. Then, the produced reduced iron and generated slag were cooled together with the atmosphere control carbonaceous material remaining on the hearth, and discharged from the hearth by a scraper device. The discharged material was put in a magnetic separator and through a sieve to separate the reduced ion, the generated slag and the remaining carbonaceous material. The separated remaining carbonaceous material was recovered, returned as a recycled carbonaceous material to the raw material feed portion, and then again used. The operation conditions for reduction and melting were as follows.

Operation Conditions

Raw material pellet: An iron ore raw material having the composition below was mixed with a carbonaceous material powder at a ratio by mass of 78:22, and a small amount of binder was added to the resultant mixture. The mixture was then granulated and dried to obtain granular pellets having an average gain diameter of 18 mm.

Composition of iron ore raw material (% by mass): T. Fe; 68.1%, $SiO_2$: 1.4%, $Al_2O_3$; 0.5%

Operation Conditions

Heat-reduction zone; temperature . . . about 1350° C., retention time . . . 10 minutes Melting zone; temperature . . . about 1450° C., retention time . . . 5 minutes.

A continuous operation was performed by this method using a mixture of 40 parts by mass of fresh carbonaceous material and 60 parts by mass of recycled carbonaceous material. As a result, the mixed carbonaceous material was not resolidified in the reduction melting step, and thus discharge from the hearth furnace by the scraper device and recycling could be smoothly performed, thereby permitting a continuous operation without any problem.

Example 3

Figure 2:
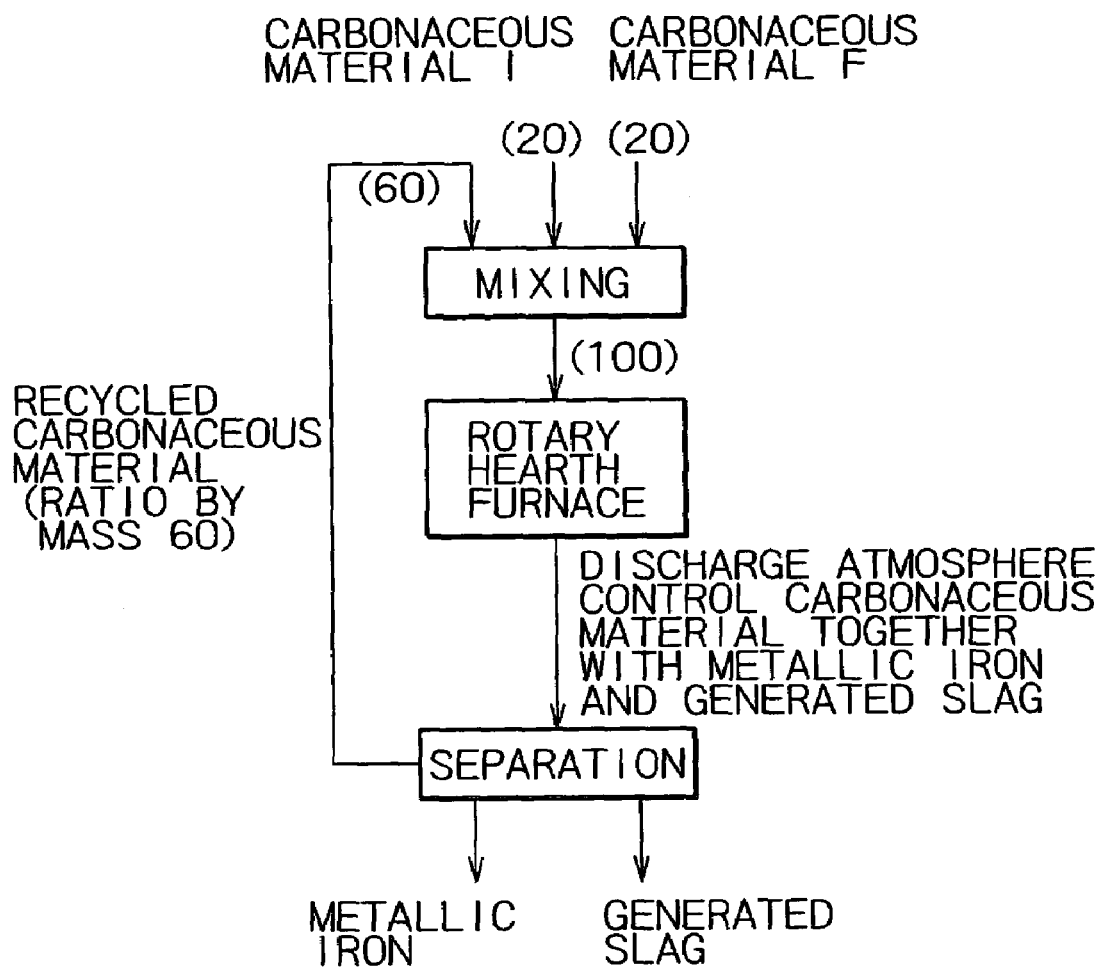
FIG. 2 is a flowchart of reduction and melting performed in another example of the present invention.

Another experiment was conducted according to the flowchart of FIG. 2 using the same rotary hearth furnace-type reduction melting apparatus as described above. In this apparatus, a fresh material of carbonaceous material I (resolidificable) shown in Table 1, a fresh material of carbonaceous material F (non-resolidificable) shown in Table 1, and a recycled material recovered after being heated in the apparatus were mixed at a ratio by part of 20:20:60, and the resultant mixture was used in a similar continuous operation. The raw material pellets used and operation conditions were the same as Example 1.

As a result, the atmosphere control carbonaceous material was not resolidified at the discharge position of the cold-solidified product after reduction and melting, thereby permitting smooth discharge of the product by the scraper device. Also, the discharged product was put in a magnetic separator and through a sieve to recover the granular metallic iron and to separate the generated slag, obtaining the residual carbonaceous material. The recovered residual carbonaceous material (grain diameter: 3 mm or less) could be repeatedly used as the non-resolidificable carbonaceous material without any problem.

Example 4

The degree of crushing of carbonaceous material F shown in Table 1 was changed to prepare two types of carbonaceous materials respectively having the grain size patterns shown in Table 3, and each of the two carbonaceous materials was used in the same heating test as Example 1 to compare the presence of resolidification. The results are as shown in Table 3. Even with carbonaceous materials having the same composition, resolidificability depends upon the grain size pattern, and the carbonaceous material containing 20% by mass or more of grains having a grain size in the range of 0.5 to 3.25 mm is not resolidified, while the carbonaceous material containing less than 20% by mass of grains having a grain size in the same range (i.e., containing over 80% by mass of fine grains of less than 0.5 mm) is slightly resolidified. It is thus found that proper control of the grain size pattern of a carbonaceous material is also effective in preventing resolidification.

TABLE 3

| | Gain size distribution (mass %) | | | | |
| --- | --- | --- | --- | --- | --- |
| | Over 3.35 mm | 0.5 to 3.35 mm | Less than 0.5 mm | Total | Result of heating test |
| Carbonaceous material F-1 | 0.0 | 23.6 | 76.4 | 100 | No re-solidification |
| Carbonaceous material F-2 | 0.0 | 18.2 | 81.8 | 100 | Low re-solidification |

Example 5

50 g of carbonaceous material C shown in Table 1 was spread on a refractory tray of an experimental heating furnace, and about 170 g of dry pellets (grain diameter: 9.5 to 13.2 mm) having the same raw material composition as Example 1 was charged in a layer on carbonaceous material C. Then, reduction and melting were performed at a furnace temperature of 1450° C. for 20 minutes in a nitrogen atmosphere to produce granular iron and generated slag. The grain size distributions of the produced iron and generated slag were examined (Experiments 1 and 2).

Also, reduction and melting were performed by the same method as described above except that a mixture of 50 g of the same carbonaceous material, 20 g of granular iron having a grain diameter of 1 to 3.35 mm, and 1 g of slag was spread on the refractory tray to produce granular ion and generated slag. The grain size distributions of the produced iron and generated slag were examined (Experiments 3 and 4). The results are shown in Table 4.

TABLE 4

| | Experiment No. | | | |
| --- | --- | --- | --- | --- |
| | 1 | 2 | 3 | 4 |
| Specimen | | | | |
| Dry pellet | | | | |
| Grain diameter (mm) | 9.5-13.2 | 9.5-13.2 | 9.5-13.2 | 9.5-13.2 |
| Weight (g) | 173 | 170 | 167 | 171 |
| Recycled granular iron | | | | |
| Grain diameter (mm) | — | — | 1-3.35 | 1-3.35 |
| Weight (g) | — | — | 20 | 20 |
| Recycled slag | | | | |
| Grain diameter (mm) | — | — | 1-3.35 | 1-3.35 |
| Weight (g) | — | — | 1 | 1 |
| Weight of product after test | | | | |
| Granular iron | | | | |
| 6.7 mm or more (g) | 24.7 | 28.5 | 23.4 | 25.4 |
| 3.35 to 6.7 mm (g) | 34.1 | 27.9 | 39.5 | 38.9 |
| 1 to 3.35 m (g) | 22.2 | 23.5 | 34.3 | 35.0 |
| Sub-total (g) | 81.0 | 79.9 | 97.2 | 99.3 |
| Slag | | | | |
| 6.7 mm or more (g) | 0.1 | 0.0 | 0.0 | 0.2 |
| 3.35 to 6.7 mm (g) | 3.2 | 2.9 | 3.3 | 3.6 |
| 1 to 3.35 mm (g) | 0.7 | 0.5 | 1.2 | 1.2 |
| Sub-total (g) | 4.0 | 3.4 | 4.5 | 5.0 |
| Total (g) | 85.0 | 83.3 | 101.7 | 104.3 |

These experiments were carried out for confirming the degree of recovery of the granular iron and slag mixed in the recycled carbonaceous material in recycling the carbonaceous material used as the atmosphere control carbonaceous material. Experiments 1 and 2 are experimental examples on the assumption that the carbonaceous material is not recycled, and Experiments 3 and 4 are experimental examples on the assumption that the carbonaceous material is recycled.

A comparison between Experiments 1 and 2 and Experiments 3 and 4 shown in Table 4 indicates that in Experiments 3 and 4 on the assumption that the carbonaceous material is recycled, the amounts of the produced granular iron and slag having a diameter of 1 to 3.35 mm are decreased as compared with the totals of the amounts in Experiments 1 and 2 and the amounts of the granular iron and slag initially mixed with the carbonaceous material, while the amounts of the produced products having a diameter of 3.35 to 6.7 mm are accordingly increased. It is thus found that the granular iron and slag previously mixed in the carbonaceous material (corresponding to the recycled carbonaceous material containing granular iron and slag) coalesce in the reduction and melting process.

Example 6

Figure 3:
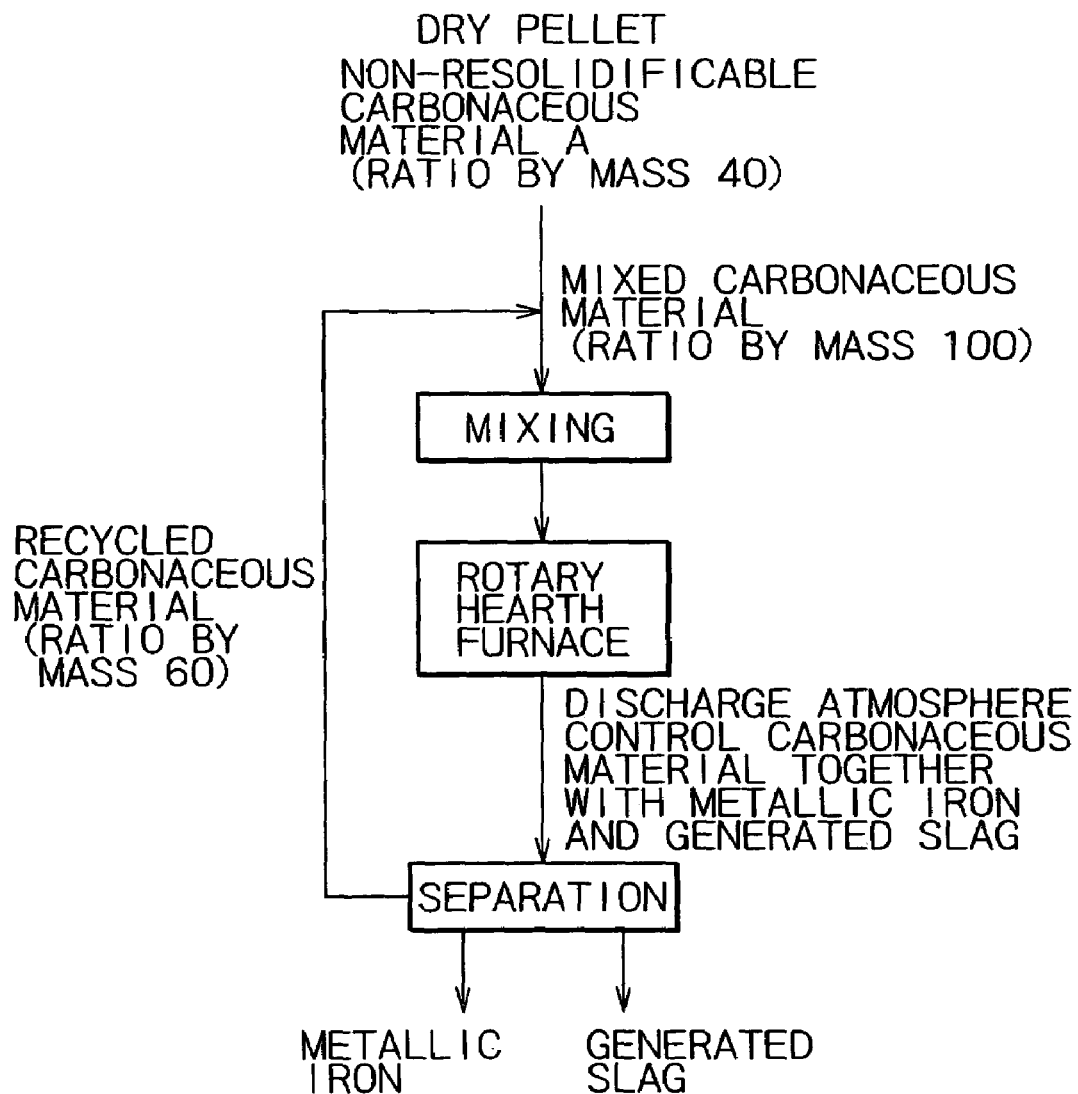
FIG. 3 is a flowchart of reduction and melting performed in a further example of the present invention.

As shown in FIG. 3, non-resolidificable carbonaceous material A (40 parts by mass) and recycled carbonaceous material (60 parts by mass) were mixed to prepare a mixed carbonaceous material (100 parts by mass). The thus-prepared mixed carbonaceous material was spread on a hearth of a rotary hearth furnace by the same method as Example 1, and carbonaceous material-containing dry pellets were charged on the mixed carbonaceous material. Then, reduction and melting were performed, and the obtained product was cooled, discharged, and then sieved to recover granular iron and generated slag having a grain diameter of about 3 mm or more suitable for industrial utilization. Consequently, a carbonaceous material of about 3 mm or less containing fine granular iron and slag was recovered. Therefore, the whole amount of the recovered carbonaceous material was cyclically used as a recycled carbonaceous material, and 40 parts by mass of fresh carbonaceous material was added to the recycled material to balance the production line as a whole, permitting a smooth continuous operation.

Reference Example

Figure 4:
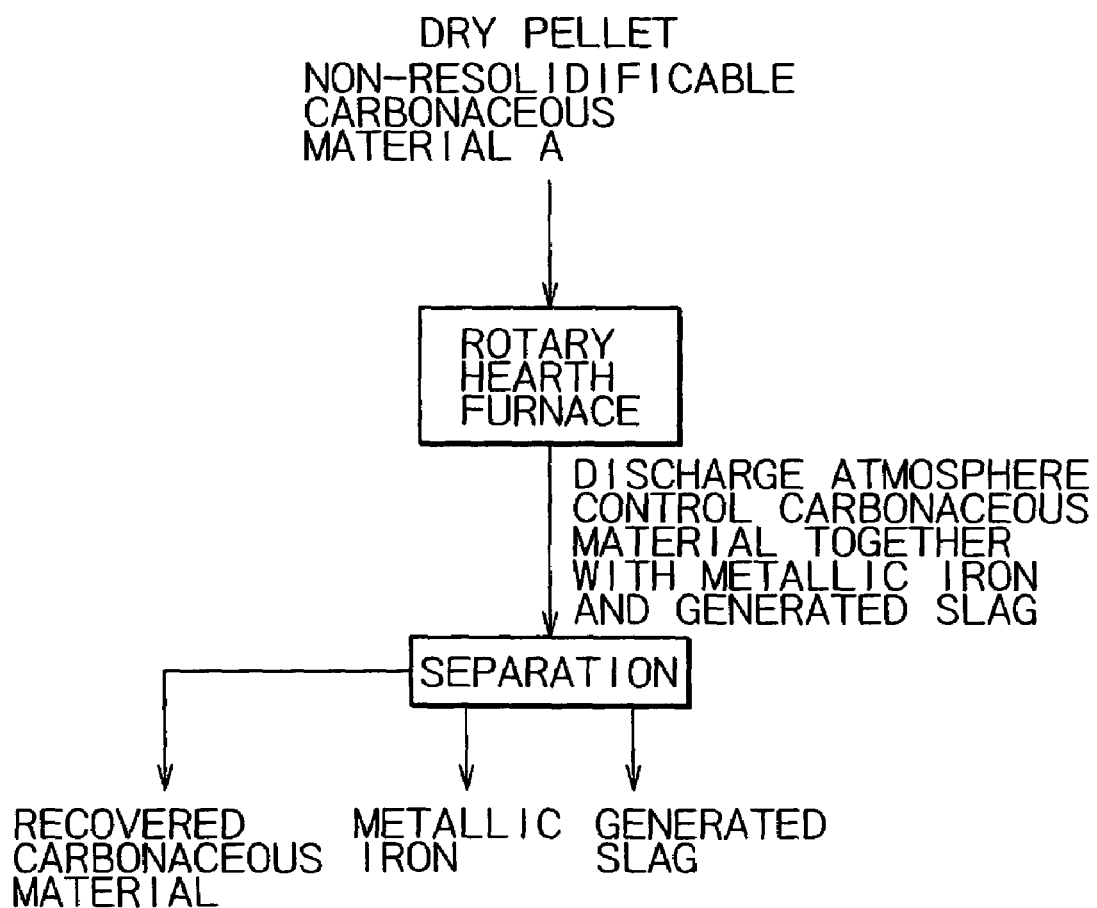
FIG. 4 is a flowchart of reduction and melting preformed in a reference example of the present invention.

Reduction and melting were performed by the same method as described above except that dry pellets and non-resolidificable carbonaceous material A were used without a recycle of the carbonaceous material according to the flowchart of FIG. 4. The produced granular iron and generated slag and the recovered carbonaceous material were sieved with a grain diameter of about 3 mm. In this case, about 9% by mass of the whole metallic iron discharged from the furnace was contained as fine grain iron in the recovered carbonaceous material, causing a product loss corresponding to the fine grain iron. Similarly, in a case in which the carbonaceous material is not recycled, about 70% by mass of the whole generated slag discharged from the furnace is discharged as fine grain slag together with the recovered carbonaceous material, thereby causing a loss corresponding to the discharged fine grain slag in recovering the slag as a valuable resource.

Example 7

Figure 5:
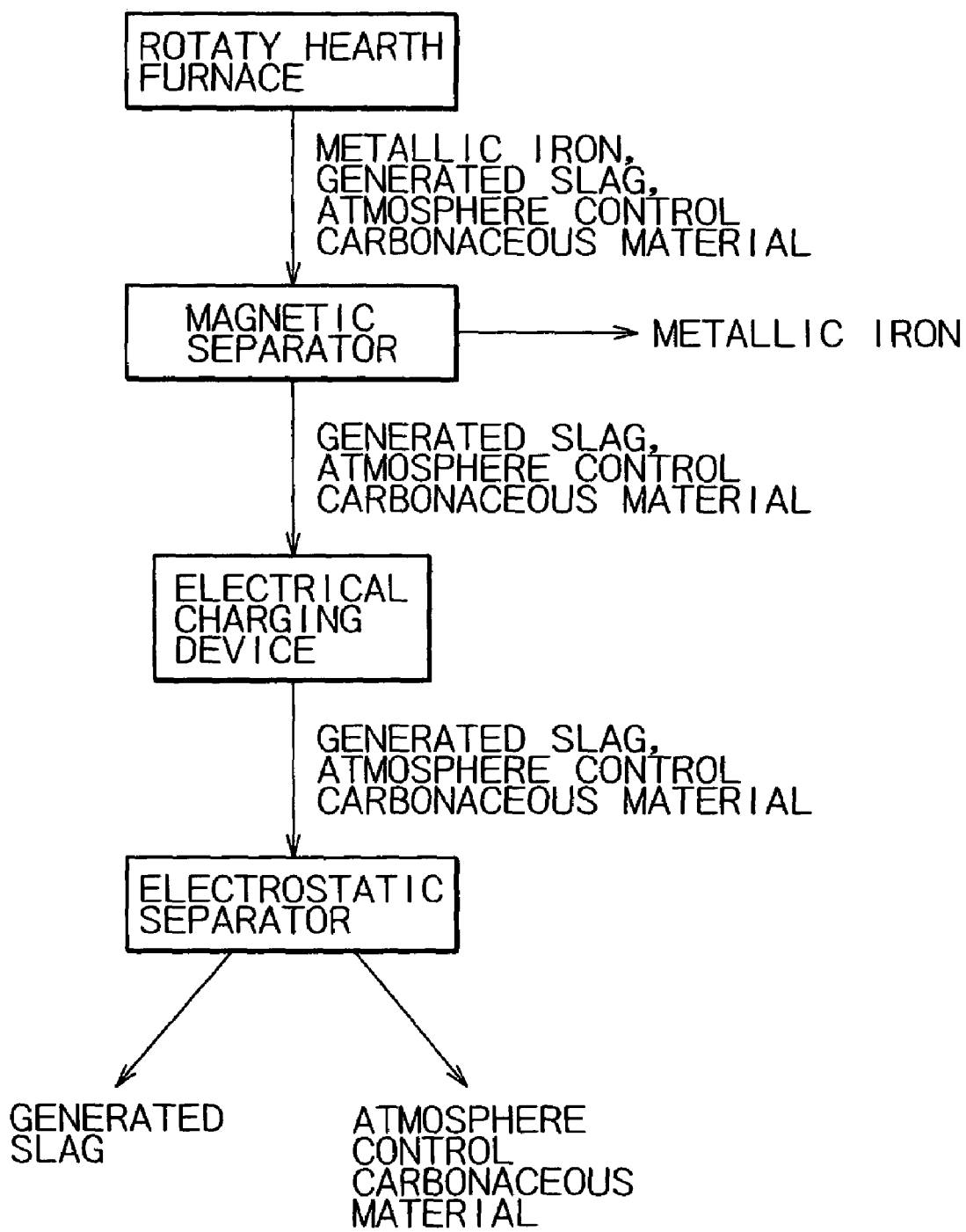
FIG. 5 is a flowchart showing a step of separating metallic iron, generated slag, and a recovered carbonaceous material according to the present invention.

In each of the separating operations of Example 1 (FIG. 1) and Example 2(FIG. 2), a mixture of the metallic iron and generated slag discharged from the furnace, and the atmosphere control carbonaceous material was subjected to magnetic separation to recover metallic iron as shown in FIG. 5. Then, a mixture of the remaining generated slag and atmosphere control carbonaceous material was triboelectrically charged, and then supplied to an electrostatic separator provided with positive and negative electrodes to separate the generated slag (negatively charged) and the atmosphere control carbonaceous material (positively charged). The separated atmosphere control carbonaceous material can be recycled in the same manner as shown in FIGS. 1 and 2.

As the electrical charging method, electrical charging methods other than the triboelectrical charging method, for example, an electrical charging method using an ion generator, a corona electrical charging method, and the like may be used.

INDUSTRIAL APPLICABILITY

In the present invention having the above-descried construction, a raw material containing an iron oxide-containing material and a carbonaceous reducing agent is heated on a moving hearth to reduce iron oxide in the raw material, to produce metallic iron. In the production, the raw material is supplied after a powder and granular atmosphere control carbonaceous material is spread on the hearth. When a non-resolidificable carbonaceous material is used as the atmosphere control carbonaceous material, the carbonaceous material can be prevented from being resolidified to a rice-cracker-like shape causing a failure in discharge, thereby permitting a smooth continuous operation and suppressing damage to a hearth refractory to lengthen the life thereof.

Furthermore, by using a method of recycling the carbonaceous material recovered from the metallic iron producing apparatus and using the recycled carbonaceous material as the atmosphere control carbonaceous material, the consumption of the carbonaceous material can be significantly decreased, and metallic iron and generated slag contained in the recovered carbonaceous material, which are conventionally discarded, can be recovered, thereby improving the recovery ratio. Therefore, a kill-two-birds-with-one-stone additional functional effect can be obtained.

The invention claimed is:

1. A method of producing metallic iron comprising:
   spreading a powder and granular atmosphere control carbonaceous material on a moving hearth;
   supplying a raw material which contains an iron oxide-containing material and a carbonaceous reducing agent on the powder and granular atmosphere control carbonaceous material spread on the hearth; and
   heating the raw material on the moving hearth to reduce iron oxide in the raw material,
   wherein the powder and granular atmosphere control carbonaceous material is a non-resolidificable carbonaceous material, which non-resolidificable carbonaceous material remains a powder or granular material during the heating step,
   wherein a mixture of a non-resolidificable carbonaceous material and a recovered carbonaceous material having been heated in a metallic iron producing apparatus is used as the atmosphere control carbonaceous material.

2. A method of producing metallic iron comprising:
   spreading a powder and granular atmosphere control carbonaceous material on a moving hearth;
   supplying a raw material which contains an iron oxide-containing material and a carbonaceous reducing agent on the powder and granular atmosphere control carbonaceous material spread on the hearth; and
   heating the raw material on the moving hearth to reduce iron oxide in the raw material,
   wherein the powder and granular atmosphere control carbonaceous material is a non-resolidificable carbonaceous material, which non-resolidificable carbonaceous material remains a powder or granular material during the heating step,
   wherein a mixed non-resolidificable carbonaceous material formed by mixing a non-resolidificable carbonaceous material with a resolidificable carbonaceous material in proportions to produce a non-resolidificable carbonaceous material is used as the atmosphere control carbonaceous material.

3. A producing method according to claim 2, wherein a fresh carbonaceous material is used as the resolidificable carbonaceous material, and a heat-treated carbonaceous material is used as the non-resolidificable carbonaceous material.

4. A producing method according to claim 3, wherein a recovered carbonaceous material having been heated in a metallic iron making apparatus is used as the heat-treated carbonaceous material.

5. A producing method according claim 2, wherein the mixing ratio of the non-resolidificable carbonaceous material is 50 to 90% by mass relative to 50 to 10% by mass of the resolidificable carbonaceous material.

6. A method of producing metallic iron comprising:

spreading a powder and granular atmosphere control carbonaceous material on a moving hearth;

supplying a raw material which contains an iron oxide-containing material and a carbonaceous reducing agent on the powder and granular atmosphere control carbonaceous material spread on the hearth; and heating the raw material on the moving hearth to reduce iron oxide in the raw material, wherein the powder and granular atmosphere control carbonaceous material is a non-resolidificable carbonaceous material, which non-resolidificable carbonaceous material remains a powder or granular material during the heating step, wherein a portion of the metallic iron discharged from the moving hearth furnace is returned to the moving hearth furnace together with the powder or granular atmosphere control carbonaceous material.

7. A method of producing metallic iron comprising:

spreading a powder and granular atmosphere control carbonaceous material on a moving hearth, wherein the atmosphere control carbonaceous material comprises a recovered carbonaceous material which has been heated in a metallic iron producing apparatus;

supplying a raw material which contains an iron oxide-containing material and a carbonaceous reducing agent on the powder and granular atmosphere control carbonaceous material spread on the hearth; and heating the raw material on the moving hearth to reduce iron oxide in the raw material, wherein the powder and granular atmosphere control carbonaceous material is a non-resolidificable carbonaceous material, which non-resolidificable carbonaceous material remains a powder or granular material during the heating step, wherein the carbonaceous material is recovered by using static electricity.

* * * * *

UNITED STATES PATENT AND TRADEMARK OFFICE
CERTIFICATE OF CORRECTION

PATENT NO.        : 7,384,450 B2
APPLICATION NO.   : 10/493313
DATED             : June 10, 2008
INVENTOR(S)       : Kikuchi It is certified that error appears in the above-identified patent and that said Letters Patent is hereby corrected as shown below:

On the title page, Item (73), the Assignee information is incorrect. Item (73) should read:

-- (73) Assignee: Kabushiki Kaisha Kobe Seiko Sho (Kobe Steel, Ltd.), Kobe-shi (JP) --

Signed and Sealed this

Fifth Day of August, 2008

JON W. DUDAS
*Director of the United States Patent and Trademark Office*